(12) United States Patent
Kleder (10) Patent No.: US 8,083,142 B2
(45) Date of Patent: Dec. 27, 2011

(54) SYSTEM AND METHOD FOR TARGET TRACKING

(76) Inventor: Michael C. Kleder, McLean, VA (US)

( * ) Notice: Subject to any disclaimer, the term of this patent is extended or adjusted under 35 U.S.C. 154(b) by 85 days.

(21) Appl. No.: 11/935,685

(22) Filed: Nov. 6, 2007

(65) Prior Publication Data
US 2009/0236422 A1    Sep. 24, 2009

Related U.S. Application Data

(60) Provisional application No. 60/857,090, filed on Nov. 6, 2006.

(51) Int. Cl.
*G06F 19/00* (2011.01)
*G06G 7/80* (2006.01)

(52) U.S. Cl. .......................... 235/411; 235/417

(58) Field of Classification Search .................. 235/411, 235/412, 413, 417
See application file for complete search history.

(56) References Cited

U.S. PATENT DOCUMENTS

| | | | |
|---|---|---|---|
| 5,798,942 A | 8/1998 | Danchick et al. | |
| 5,842,156 A * | 11/1998 | Hong et al. | 702/179 |
| 6,707,418 B2 * | 3/2004 | Hassebrock et al. | 342/189 |
| 6,833,807 B2 | 12/2004 | Flacke et al. | |
| 2006/0245500 A1 | 11/2006 | Yonovitz | |

OTHER PUBLICATIONS

D. Vallado et al., "Fundamentals of Astrodynamics and Applications", 2001, Springer, p. 448.*

International Preliminary Report on Patentability with Written Opinion, dated May 22, 2009, in international patent application No. PCT/US07/083744, 7 pgs.
International Search Report with Written Opinion, dated Oct. 24, 2008, in international patent application No. PCT/US07/83744, 9 pgs.
Woods, Edward and Queeney, Tom, "Multisensor detection and tracking of tactical ballistic missiles using knowledge-based state estimation," Proceedings of the SPIE—The International Society for Optical Engineering, Jun. 6, 1994, vol. 2232, pp. 111-121, XP002631794.
Extended European Search Report for European Appl. No. 07873595,8 -1248, dated Apr. 26. 2011 (9 pgs.).

* cited by examiner

*Primary Examiner* — Thien M. Le
*Assistant Examiner* — Christopher Stanford
(74) *Attorney, Agent, or Firm* — MH2 Technology Law Group, LLP (57) ABSTRACT

A method, computer program product, and target tracking system for obtaining a first kinematic state measurement of a first projectile detection event from a first sensor. The first kinematic state measurement includes a first time measurement and a first state vector. A second kinematic state measurement of a second projectile detection event is obtained from a second sensor. The second kinematic state measurement includes a second time measurement and a second state vector. If it is determined that at least a portion of the first kinematic state measurement and at least a portion of the second kinematic state measurement define at least a portion of a flight trajectory orbital ellipse, the first projectile detection event and the second projectile detection event are defined as portions of a flight trajectory of a single ballistic projectile.

20 Claims, 4 Drawing Sheets

SYSTEM AND METHOD FOR TARGET TRACKING

RELATED APPLICATION(S)

This application claims the benefit of U.S. Provisional Patent Application No. 60/857,090, entitled "Multisensor Data Fusion Handoff" and filed 6 Nov. 2006, the contents of which are herein incorporated by reference.

STATEMENT REGARDING FEDERALLY SPONSORED RESEARCH OR DEVELOPMENT

This invention was made with Government support under contract W9113M-06-C-0053 awarded by The U.S. Army Space and Missile Defense Command. The U.S. Government has certain rights in the invention.

TECHNICAL FIELD

This disclosure relates to target tracking, and, more particularly, to multi-sensor data fusion for target tracking.

BACKGROUND

Target tracking often involves comparing target tracks across multiple sensors to determine if the different tracks appearing on each sensor represent the same object and to combine the tracks on the sensors to gain a better understanding of the true location and velocity of the target. Hereafter location and velocity of an object in flight may collectively be called the "state" or "state vector" of the object. This comparison is often complicated by gaps between sensor scan areas and/or data latency from one sensor report to the next.

Traditional target tracking methodologies may often involve mathematically propagating individual observations to generate probability distributions for subsequent object states, using process and sensor noise estimates to generate the distribution. Subsequent observations may then be compared to the probability distribution to determine the appropriate correlation. A ballistic propagation model may be assumed as a default for object state prediction because object maneuvering may be generally inherently unpredictable. Deviations from the prediction may be handled according to magnitude and consistency as random process noise, measurement noise, target maneuvering or object appearance or disappearance. Heuristics may then determine whether the deviant measurement is incorporated into an overall understanding of the relationships among all objects relevant to a combat situation (hereinafter called the "battlespace") as a track continuation, a track initiation, or a spurious measurement.

The most precisely reported quantity from most sensors used for tracking is the time of the measurement. Following in order of decreasing precision are position and velocity. In traditional target tracking methodologies, two state measurements may be associated if, by propagating the state vector (position and velocity) of the first state measurement, the second state vector is encountered within a radius of uncertainty that is considered reasonable.

Unfortunately, the time between the two measurements may only appear during the most error-laden piece of the hypothesis test, namely the propagation of the first state measurement. Thus, the precision of the most accurate information available (i.e., time of flight) may be wholly wasted, and the most imprecise information (i.e., the velocity of the initial state measurement) may be relied upon to create the probability distribution against which the final state measurement is compared.

Thus, the primary source of uncertainty or error in these methods is the propagation of the initial observation. Additionally, these methods may be slow and may waste valuable time needed for intercepting hostile targets.

SUMMARY OF THE DISCLOSURE

In a first implementation, a method of identifying a single ballistic projectile includes obtaining a first kinematic state measurement of a first projectile detection event from a first sensor. The first kinematic state measurement includes a first time measurement and a first state vector. A second kinematic state measurement of a second projectile detection event is obtained from a second sensor. The second kinematic state measurement includes a second time measurement and a second state vector. If it is determined that at least a portion of the first kinematic state measurement and at least a portion of the second kinematic state measurement define at least a portion of a flight trajectory orbital ellipse, the first projectile detection event and the second projectile detection event are defined as portions of a flight trajectory of a single ballistic projectile.

One or more of the following features may be included. The at least a portion of a flight trajectory orbital ellipse may be propagated to define a full flight trajectory for the single ballistic projectile.

Determining if at least a portion of the first kinematic state measurement and at least a portion of the second kinematic state measurement define at least a portion of a flight trajectory orbital ellipse may include calculating a time differential between the first time measurement and the second time measurement. A flight trajectory orbital ellipse defining a trajectory between a first position and/or velocity measurement associated with the first state vector and a second position and/or velocity measurement associated with the second state vector may be identified based upon the time differential. The first and second state vectors may be statistically compared against the flight trajectory orbital ellipse to determine if the first and second kinematic state measurements arise from a ballistic continuation of the single ballistic projectile.

Statistically comparing the first and second state vectors against the flight trajectory orbital ellipse to determine if the first and second kinematic state measurements arise from a ballistic continuation of the single ballistic projectile may include generating at least one probability distribution for at least one trajectory variable to enable a statistical comparison between a detected state vector and the flight trajectory orbital ellipse.

A plurality of additional kinematic state measurements of a plurality of additional projectile detection events from a plurality of additional sensors may be obtained. The plurality of additional kinematic state measurements may each include a time measurement and a state vector. The plurality of additional kinematic state measurements may be compared against the flight trajectory orbital ellipse to determine if the plurality of additional kinematic state measurements arise from the ballistic continuation of the single ballistic projectile. The single ballistic projectile may be a target. The first and second sensors may be a single sensor.

According to another implementation, a computer program product may reside on a computer readable medium and may have a plurality of instructions stored thereon. When executed by a processor, the instructions may cause the processor to perform operations including obtaining a first kinematic state measurement of a first projectile detection event from a first sensor. The first kinematic state measurement includes a first time measurement and a first state vector. A second kinematic state measurement of a second projectile detection event is obtained from a second sensor. The second kinematic state measurement includes a second time measurement and a second state vector. If it is determined that at least a portion of the first kinematic state measurement and at least a portion of the second kinematic state measurement define at least a portion of a flight trajectory orbital ellipse, the first projectile detection event and the second projectile detection event are defined as portions of a flight trajectory of a single ballistic projectile.

One or more of the following features may be included. The at least a portion of a flight trajectory orbital ellipse may be propagated to define a full flight trajectory for the single ballistic projectile.

Determining if at least a portion of the first kinematic state measurement and at least a portion of the second kinematic state measurement define at least a portion of a flight trajectory orbital ellipse may include calculating a time differential between the first time measurement and the second time measurement. A flight trajectory orbital ellipse defining a trajectory between a first position and/or velocity measurement associated with the first state vector and a second position and/or velocity measurement associated with the second state vector may be identified based upon the time differential. The first and second state vectors may be statistically compared against the flight trajectory orbital ellipse to determine if the first and second kinematic state measurements arise from a ballistic continuation of the single ballistic projectile.

Statistically comparing the first and second state vectors against the flight trajectory orbital ellipse to determine if the first and second kinematic state measurements arise from a ballistic continuation of the single ballistic projectile may include generating at least one probability distribution for at least one trajectory variable to enable a statistical comparison between a detected state vector and the flight trajectory orbital ellipse.

A plurality of additional kinematic state measurements of a plurality of additional projectile detection events from a plurality of additional sensors may be obtained. The plurality of additional kinematic state measurements may each include a time measurement and a state vector. The plurality of additional kinematic state measurements may be compared against the flight trajectory orbital ellipse to determine if the plurality of additional kinematic state measurements arise from the ballistic continuation of the single ballistic projectile. The single ballistic projectile may be a target. The first and second sensors may be a single sensor.

According to another implementation, a target tracking system includes at least two temporally-separated sensors and a computing device operably coupled to the at least two temporally-separated sensors.

The first temporally-separated sensor is configured to obtain a first kinematic state measurement of a first projectile detection event. The first kinematic state measurement includes a first time measurement and a first state vector.

The second temporally-separated sensor is configured to obtain a second kinematic state measurement of a second projectile detection event. The second kinematic state measurement includes a second time measurement and a second state vector.

The computing device is configured to perform operations including, if it is determined that at least a portion of the first kinematic state measurement and at least a portion of the second kinematic state measurement define at least a portion of a flight trajectory orbital ellipse, the first projectile detection event and the second projectile detection event are defined as portions of a flight trajectory of a single ballistic projectile.

One or more of the following features may be included. The at least a portion of a flight trajectory orbital ellipse may be propagated to define a full flight trajectory for the single ballistic projectile.

Determining if at least a portion of the first kinematic state measurement and at least a portion of the second kinematic state measurement define at least a portion of a flight trajectory orbital ellipse may include calculating a time differential between the first time measurement and the second time measurement. A flight trajectory orbital ellipse defining a trajectory between a first position and/or velocity measurement associated with the first state vector and a second position and/or velocity measurement associated with the second state vector may be identified based upon the time differential. The first and second state vectors may be statistically compared against the flight trajectory orbital ellipse to determine if the first and second kinematic state measurements arise from a ballistic continuation of the single ballistic projectile.

Statistically comparing the first and second state vectors against the flight trajectory orbital ellipse to determine if the first and second kinematic state measurements arise from a ballistic continuation of the single ballistic projectile may include generating at least one probability distribution for at least one trajectory variable to enable a statistical comparison between a detected state vector and the flight trajectory orbital ellipse.

A plurality of additional kinematic state measurements of a plurality of additional projectile detection events from a plurality of additional sensors may be obtained. The plurality of additional kinematic state measurements may each include a time measurement and a state vector. The plurality of additional kinematic state measurements may be compared against the flight trajectory orbital ellipse to determine if the plurality of additional kinematic state measurements arise from the ballistic continuation of the single ballistic projectile. The single ballistic projectile may be a target.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF EXEMPLARY EMBODIMENTS

Propagation Hypothesis Testing

Figure 1:
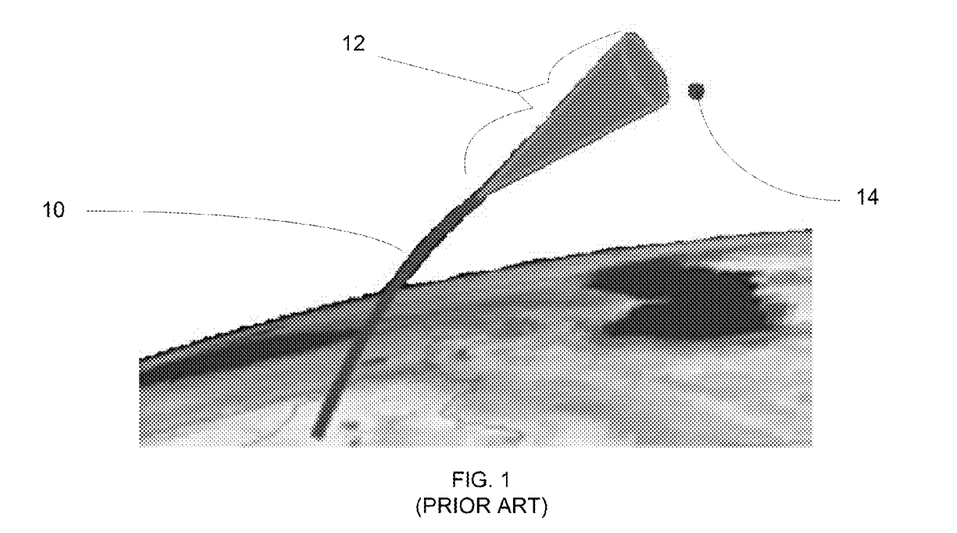
FIG. 1 is an illustration of a prior art target tracking methodology.

Referring to FIG. 1, there is shown an illustration of how traditional methods of object tracking work. Traditional methods (e.g., multiple-hypothesis correlation, interacting multiple model tracking, feature-based discrimination, and inference-based correlation and fusion) are all statistical methods and rely (at least in part) upon a mathematical propagation based upon a state evolution model that specifies the dynamics of the evolution of the state (i.e., the state vector, or position and velocity) of a tracked object.

The evolution model may be based upon the past history of each projectile detection event 10, which may be used to generate probability distribution 12 for subsequent projectile detection events. Probability distribution 12 may be generated from process and sensor noise estimates. The flight prediction may get broader as time elapses due to uncertainty in the initial position and initial velocity measurements. Further, any newly-detected projectile detection events 14 may then be compared to the probability distribution 12 for each previously-detected projectile detection event 10 and an assignment model may correlate the newly detected projectile detection event 14 to the appropriate previously-detected projectile detection event 10. For new sensor reports that do not correlate to a previously-detected projectile detection event, heuristics may determine (i.e., after multiple hypotheses are carried for a few updates, after multiple models are compared, or after set theoretic probability is computed) whether to incorporate the deviant measurement as a continuation of a projectile detection event, or whether there is a new projectile detection event or deletion of a projectile detection event.

The traditional methods described above may incorporate a statistical model that is commonly referred to as the "Propagation Hypothesis Test". The test statistic may be the state vector of newly-detected projectile detection event 14, and the probability distribution 12 against which that statistic is compared may be the projected state of previously-detected projectile detection event 10. Because uncertainty may also be present in the measurement for newly-detected projectile detection event 14, a Mahalanobis-type hypothesis test may be performed. However, the overwhelming source of uncertainty may be the propagation of the original measurement under the state evolution model. An inherent weakness of this approach may be that the correlation between two states requires temporal propagation of one or both measured states to the same point in time for comparison. Such propagation may greatly increase the covariance estimates of the states, so that the value of statistical comparison (e.g., via Mahalanobis distance) becomes limited.

The Target Tracking Process

Figure 2:
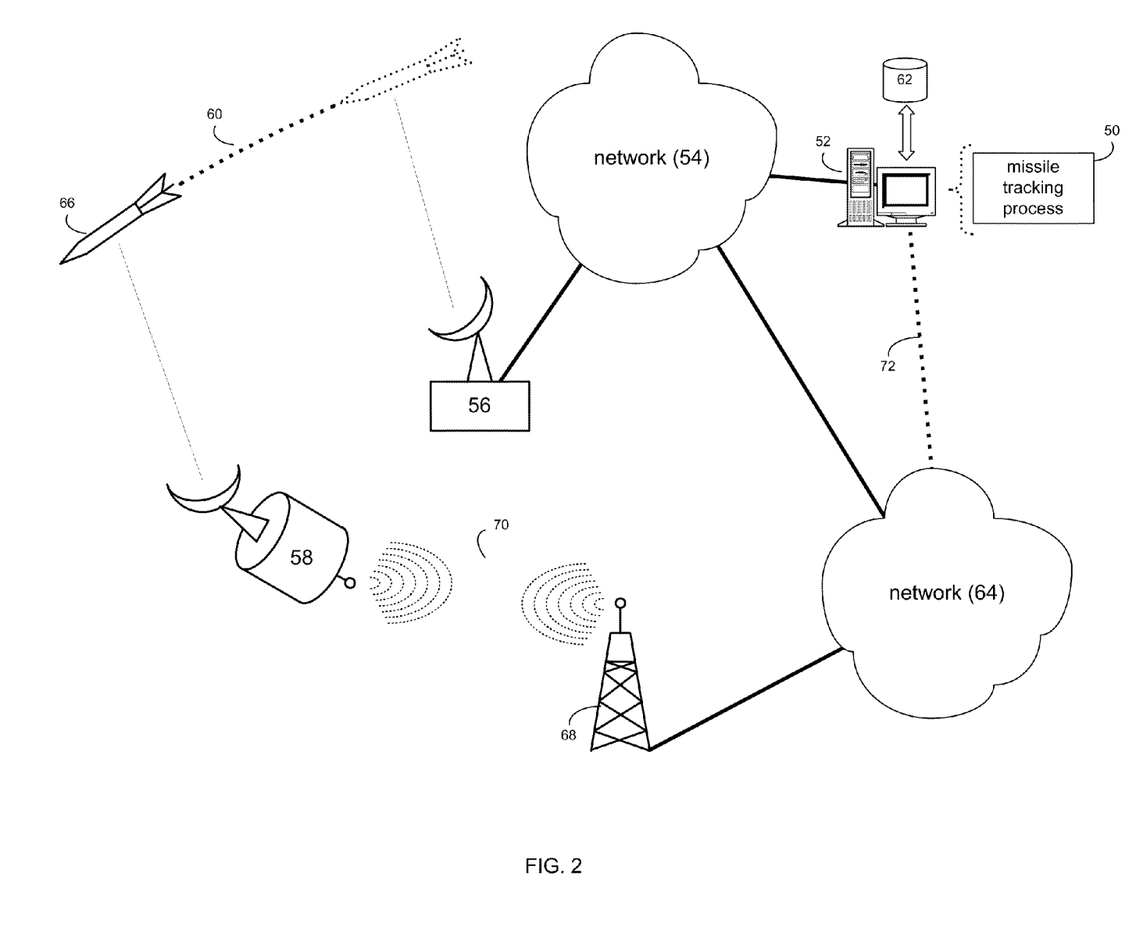
FIG. 2 is a diagrammatic view of a target tracking system coupled to a distributed computing network.

Referring also to FIG. 2, there is shown a target tracking process 50 that may reside on and may be executed by server computer 52, which may be connected to network 54 (e.g., the Internet, a local area network, or a secure data network). As will be discussed below in greater detail, target tracking process 50 may obtain a first kinematic state measurement (which may be the combination of a position and a velocity) of first projectile detection event 10 from first sensor 56. A second kinematic state measurement (which is the combination of a position and a velocity) of second projectile detection event 14 may be obtained from second sensor 58. If it is determined that at least a portion of the first kinematic state measurement and at least a portion of the second kinematic state measurement define at least a portion of flight trajectory orbital ellipse 60, the first projectile detection event and the second projectile detection event may be defined as portions of a flight trajectory of a single ballistic projectile.

Examples of server computer 52 may include but are not limited to a personal computer, a server computer, a series of server computers, a mini computer, and a mainframe computer. Server computer 52 may execute a network operating system, examples of which may include but are not limited to: Microsoft Windows XP Server™; Novell Netware™; or Redhat Linux™, for example.

The instruction sets and subroutines of target tracking process 50, which may be stored on storage device 62 coupled to server computer 52, may be executed by one or more processors (not shown) and one or more memory architectures (not shown) incorporated into server computer 52. Examples of storage device 62 may include but are not limited to: a hard disk drive; a tape drive; an optical drive; a RAID array; a random access memory; a read-only memory; a compact flash (CF) storage device, a secure digital (SD) storage device, and a memory stick storage device.

Network 54 may be coupled to one or more secondary networks (e.g., network 64), examples of which may include but are not limited to: a local area network; a wide area network; an intranet, or a second secure data network, for example.

First sensor 56 and second sensor 58 may be land-based, sea-based, and/or air-based sensors. For example, a land-based sensor (e.g., sensor 56) may be used to track target 66 during initial launch and/or during final approach. An example of such a land-based target tracking sensor may include but is not limited to a Terminal High Altitude Area Defense radar manufactured by Lockheed Martin Space Systems Company. Another example of such a land-based target tracking sensor may include but is not limited to a PAVE Phased Array Warning System manufactured by the Raytheon Company. As another example, a sea-based sensor (e.g., sensor 56) may be used to track target 66 during initial launch and/or during final approach. An example of such a sea-based target tracking sensor may include but is not limited to an AN/SPY-1 radar manufactured by Lockheed Martin Corporation.

An air-based sensor (e.g., sensor 58) may be used to track target 66 between the point of initial launch and prior to the point of final approach. Air-based sensors may be e.g., aircraft-based sensors and/or satellite-based sensors, an example of which includes but is not limited to an Airborne Warning and Control System (AWACS) radar manufactured by Northrop Grumman Corporation. While two sensors (namely sensors 56, 58) are described above, this is for illustrative purposes only and is not intended to be a limitation of this disclosure, Specifically, the number of sensors may be adjusted based on design criteria and may be increased to produce a more robust system.

Further, while sea-based or land-based sensor 56 is described above as tracking target 66 during initial launch and/or during final approach, this is for illustrative purposes only and is not intended to be a limitation of this disclosure. For example, sea-based or land-based sensor 56 may be capable of tracking target 66 during times other than during initial launch or during final approach Further, while air-based sensor 58 is described above as tracking target 66 between the point of initial launch and prior to the point of final approach, this is for illustrative purposes only and is not intended to be a limitation of this disclosure. For example, air-based sensor 58 may be capable of tracking target 66 during times other than between the point of initial launch and prior to the point of final approach.

When an air-based sensor (e.g., sensor 58) is used to track target 66, a terrestrial device (e.g., antenna assembly 68) may be used to establish a wireless communication channel 70 between air-based sensor 58 and antenna assembly 68.

One or more of sensors 56, 58 may be coupled to server computer 52 via network 64. Additionally, server computer 52 may be coupled directly to network 64, as illustrated by link line 72 (shown in phantom).

Figure 3:
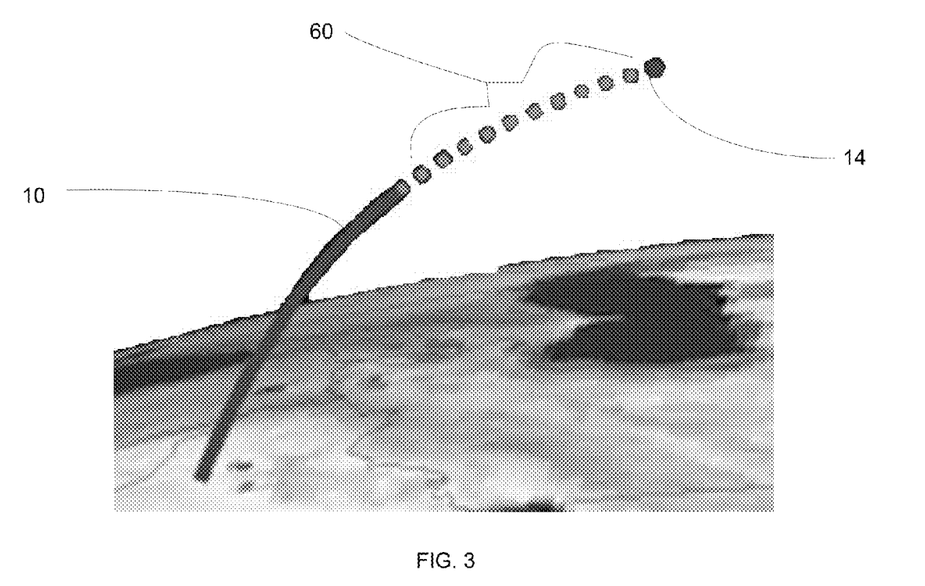
FIG. 3 is an illustration of the target tracking system of FIG. 2.

Referring to FIG. 3, there is shown an illustration of the manner in which target tracking process 50 functions. In order to minimize the uncertainty inherent in the above-described statistical propagation hypothesis test, target tracking process 50 utilizes the physics of ballistic flight when performing the object track identification analysis.

The fact that ballistic objects follow elliptical orbits has been known since before the time of Isaac Newton. In the later half of the 1700s, Johann Heinrich Lambert examined the problem of determining the unique elliptical trajectory that an orbiting body will take in order to pass through two specified points in a specified amount of transit time. This problem is known as Lambert's Two-Point Orbital Boundary Value Problem. ("Lambert's Problem"). Lambert's Problem may be solved for a spherical gravitational field, an ellipsoidal gravitational field, or for any arbitrarily defined representation of the gravitational field of earth. The resulting trajectory is hereafter called a "Lambert trajectory."

With Lambert's Problem as the scientific basis, target tracking process 50 may determine inter-sensor track correlation under circumstances in which a human would deem the correlation clear. Conversely, target tracking process 50 may leave the correlation undetermined until the above-described clarity is apparent. This inter-sensor track correlation determination may be accomplished by computing flight trajectory orbital ellipse 60, which is defined by the Lambert trajectory between each newly-detected projectile detection event 14 on the current sensor (e.g., sensor 58) and previously-detected projectile detection event 10 on a prior sensor (e.g., sensor 56).

Computing flight trajectory orbital ellipse 60 may involve solving for a realistic flight trajectory orbital ellipse 60. Once flight trajectory orbital ellipse 60 is calculated, target tracking process 50 may determine whether the projectile being tracked (e.g., target 66) followed flight trajectory orbital ellipse 60 with statistical probability, and, therefore, whether the combination of projectile detection events defines the flight trajectory of a single ballistic projectile. The state vectors of each projectile detection event may be correlated to flight trajectory orbital ellipse 60 by comparing the state vectors of each projectile detection event to flight trajectory orbital ellipse 60 (to be discussed below in greater detail).

Calculation of flight trajectory orbital ellipse 60 is a boundary value problem ("BVP"). As is known in the art, the state evolution model is a kinematic differential equation.

Figure 4:
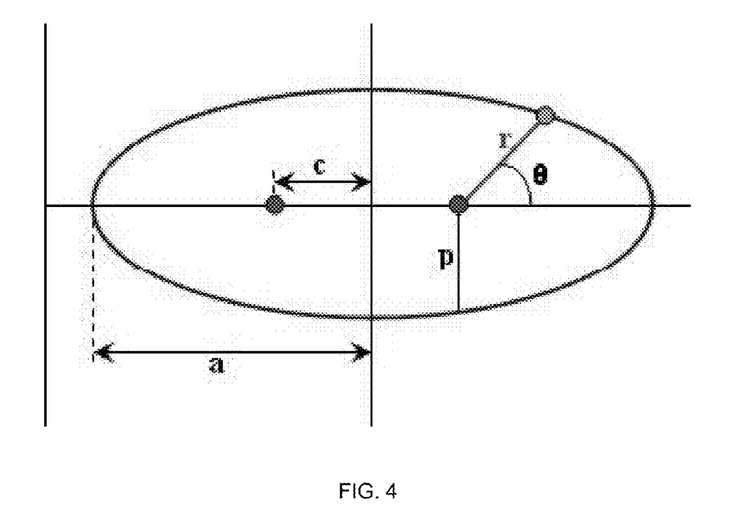
FIG. 4 is an ellipse utilized by the target tracking system of FIG. 2.

Referring also to FIG. 4, as is known in the art, the equation of an ellipse in polar coordinates is:

$$r = \frac{p}{(1 + e \cdot \cos(\theta))}$$

wherein θ is the "true anomaly" angle (i.e., the angle from the semi-major axis). Quantity r is radial distance; Quantity p is ellipse semi-latus rectum; quantity e ellipse eccentricity. Note that e=c/a where c is the ellipse focal length and a is the semi-major axis.) Thus, r and θ are coordinate variables tracing out a curve from a family of curves "indexed" by p and e, giving two degrees of freedom in the choice of the ellipse. Additionally, there is a third degree of freedom that does not appear in the above-stated equation, namely the rotation of the chosen coordinate system, or equivalently, the orientation of semi-major axis a. Since the plane of the ellipse is uniquely determined in Lambert's problem by two given locations and the center of gravity, all but one degree of freedom in the orientation of semi-major axis a may be ignored. Thus, two points in space provide enough information to fix two of the three degrees of freedom, leaving a third to be fixed by the known specified transit time.

When Johannes Kepler published his Second Law of Planetary Motion in 1609, he provided a means of determining the time taken by an orbiting body to traverse between two known points on a known ellipse. Kepler's equation:

$$M = E - e \cdot \sin(E)$$

connects the "mean anomaly" M (i.e., which is a function of time t) to the "eccentric anomaly" E, which is a function of position (i.e., of true anomaly angle θ). It is well-known in the art that when the parameters of the orbital ellipse are known, the conversion from (M,E) to (t, θ) involves only a small number of closed-form transformations.

Combining the above-described teachings of Newton, Lambert, and Kepler enables target tracking process 50 to compute flight trajectory orbital ellipse 60 provided the time differential between previously-detected projectile detection event 10 and newly-detected projectile detection event 14 is known. By using advanced numerical methods acting upon the actual gravitational ellipsoid (rather than the spherically symmetric gravity examined by Newton, Lambert, and Kepler), an actual flight trajectory (represented by flight trajectory orbital ellipse 60) may be computed. The Lambert Problem (in ellipsoidal gravity) may be defined as below, where (x,y,z) are the Cartesian coordinates of an object, r is its altitude above the center of the earth, μ is a constant equal to the mass of the earth times Newton's universal gravitational constant, $R_E$ is the radius of the earth, and $J_2$ is a physical constant, well-known in the art, called the second-degree zonal spherical harmonic coefficient of earth's gravity:

$$\begin{cases} \frac{d^2 x}{dt^2} + \frac{\mu x}{r^3}\left(1 + \frac{k}{r^2} - \frac{5kx^2}{r^4}\right) = 0 \\ \frac{d^2 y}{dt^2} + \frac{\mu y}{r^3}\left(1 + \frac{k}{r^2} - \frac{5ky^2}{r^4}\right) = 0 \\ \frac{d^2 z}{dt^2} + \frac{\mu z}{r^3}\left(1 + \frac{3k}{r^2} - \frac{5kz^2}{r^4}\right) = 0 \end{cases}$$

where $k = \frac{3}{2} J_2 R_E^2$

Figure 5:
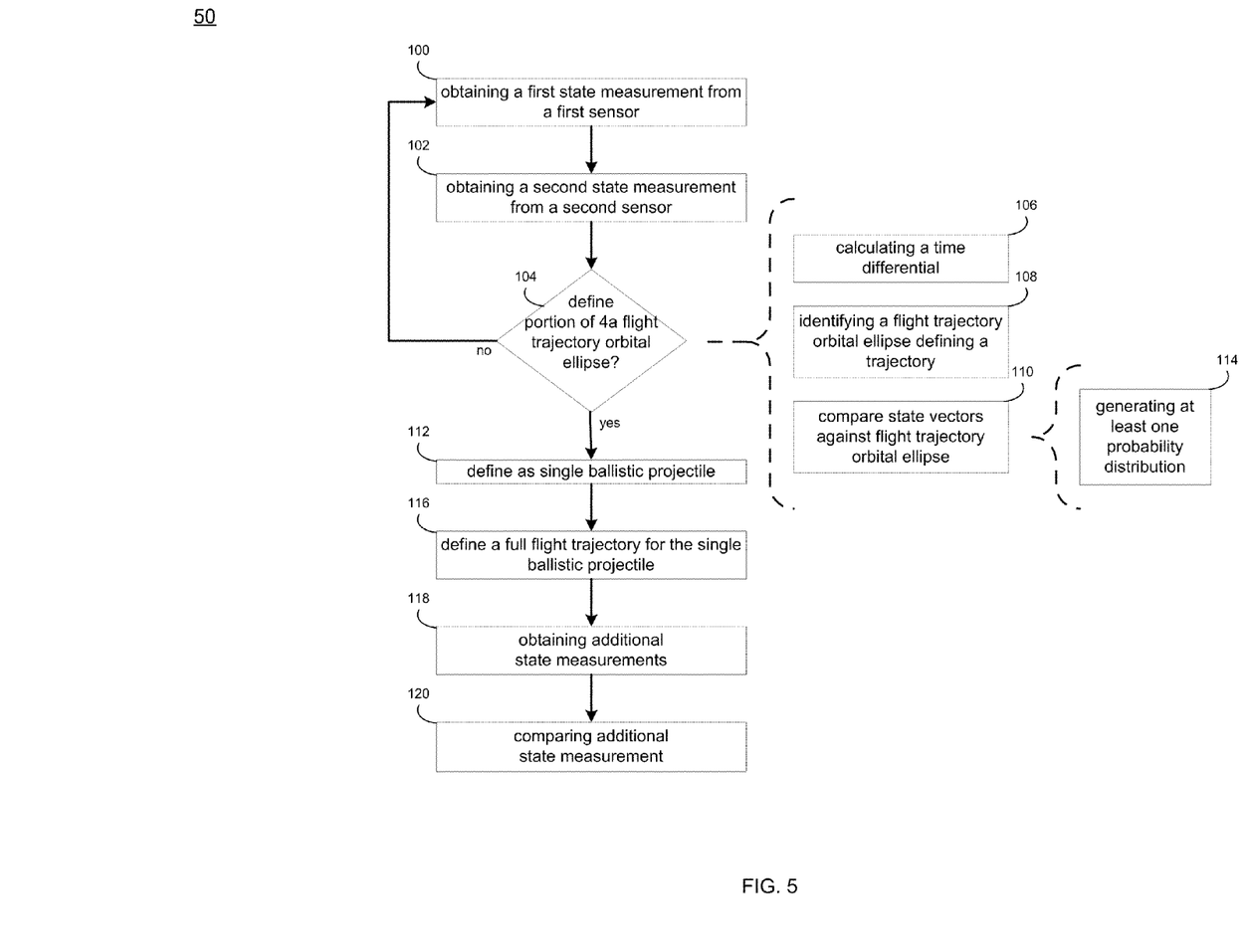
FIG. 5 is a flowchart of a process executed by the target tracking system of FIG. 2.

Referring also to FIG. 5, typically the most precise data obtained from sensors 56, 58 is the time measurement data, followed by the position measurement data, which is followed by the velocity measurement data. In boundary value hypothesis testing, target tracking process 50 may provide a Lambert trajectory in near-real time by obtaining 100 first kinematic state measurement of previously-detected projectile detection event 10 from first sensor 56. Target tracking process 50 may obtain 102 second kinematic state measurement of newly-detected projectile detection event 14 from second sensor 58.

The sensors (e.g., first sensor 56 and second sensor 58) used for detection of previously-detected projectile detection event 10 and newly-detected projectile detection event 14 (respectively) may be e.g., radar sensors, infrared sensors and the like. As discussed above, sensors 56, 58 may be temporally-separated and may be located on sensor platforms on land, in aircraft, on vessels at sea, or on satellites. The kinematic state measurements obtained 100, 102 from each of sensor 56, 58 may include time measurements and state vectors for each projectile detection event. Each state vector may include position and velocity measurements.

Using the first and second kinematic state measurements that have been obtained 100, 102 from sensors 56, 58, target tracking process 50 may determine 104 if at least a portion of the first kinematic state measurement and at least a portion of the second kinematic state measurement define at least a portion of flight trajectory orbital ellipse 60. Accordingly, target tracking process 50 may use the time measurements from the above-described first and second kinematic state measurements to calculate 106 the time differential between the first time measurement and the second time measurement.

Based upon the calculated 106 time differential and the position measurements associated with the first and second state vectors, target tracking process 50 may identify 108 flight trajectory orbital ellipse 60. Flight trajectory orbital ellipse 60 may be identified 108 by computing the Lambert trajectory between the first and second position measurements. Flight trajectory orbital ellipse 60 may be unique because it may be the only trajectory through which an object could have traveled in order to create the first and second time and position measurements at the velocity, energy and momentum values of the object.

Once target tracking process 50 identifies 108 flight trajectory orbital ellipse 60 (as described above), the first and second state vectors may be statistically compared 110 against flight trajectory orbital ellipse 60 to determine 112 whether the first and second kinematic state measurements arise from a ballistic continuation of a single ballistic projectile. Target tracking process 50 may accomplish statistical comparison 110 by generating 114 at least one probability distribution for at least one trajectory variable to enable a statistical comparison between a detected state vector and the flight trajectory orbital ellipse. For example, target tracking process 50 may use time measurements and position measurements to generate 114 the probability distribution due to their higher level of precision. The test statistic for this comparison 110 may be the Mahalanobis distance M computed between each measured state vector and the Lambert trajectory. As known in the art, an example of a computation of a Mahalanobis distance is shown below:

$$\bar{x} \in N(\bar{\mu}_x, C_x)$$

$$\bar{y} \in N(\bar{\mu}_y, C_y)$$

$$M_x^2 = (\bar{x}-\bar{\mu}_x)^T C_x^{-1} (\bar{x}-\bar{\mu}_x)$$

$$M_y^2 = (\bar{y}-\bar{\mu}_y)^T C_y^{-1} (\bar{y}-\bar{\mu}_y)$$

$$\bar{\mu}_{(x-y)} = \bar{\mu}_x - \bar{\mu}_y = 0$$

$$C_{(x-y)} = C_x + C_y$$

$$M_{(x-y)}^2 = ((\bar{x}-\bar{y})-(\bar{\mu}_x-\bar{\mu}_y))^T (C_x+C_y)^{-1} ((\bar{x}-\bar{y})-(\bar{\mu}_x-\bar{\mu}_y))$$

$$M_{(x-y)}^2 = (\bar{x}-\bar{y})^T (C_x+C_y)^{-1} (\bar{x}-\bar{y})$$

$$M = \sqrt{(\bar{x}-\bar{y})^T (C_x+C_y)^{-1} (\bar{x}-\bar{y})}$$

Despite the relative precision of the time and position measurements, target tracking process 50 may need to translate uncertainty in those input parameters (e.g., time and position measurements) into uncertainty in projectile state parameters (e.g., the state vectors) in order to create a hypothesis test. To do this, target tracking process 50 may estimate a Gaussian uncertainty in such parameters by utilizing an unscented transform. As is known in the art, an unscented transform is a statistical calculation that generates a Gaussian output distribution for a Gaussian random variable that undergoes a non-linear transformation. In order to utilize the unscented transform, target tracking process 50 may determine the multivariate normality of the Gaussian distribution, since normality of individual variables may not imply multivariate normality. For example, if x is a univariate normal and y=x, the vector (x,y) is not multivariate normal. The multivariate normality is relevant because the two kinematic state measurements occupy a six-dimensional statistical position space (e.g., a three-dimensional physical position for each measurement). Further, the computed velocities may similarly occupy a six-dimensional statistical velocity space.

A standard test of multivariate normality was proposed by Mardia in 1970 and uses either (or both) of two test statistics: multivariate skew and multivariate kurtosis. Generally, assume that a p-dimensional multivariate Gaussian vector X has a zero mean and covariance matrix C. The (scalar) multivariate skew s and the (scalar) kurtosis k of a population of size n may be defined as:

$$s = \frac{1}{n^2} \sum_{i,j=1}^{n} (X_i^T C^{-1} X_j)^3$$

and $$k = \frac{1}{n} \sum_{n} (X_n^T C^{-1} X_n)^2$$

For p-dimensional samples of size n drawn from a normal distribution, the scalar skew test statistic $$\frac{ns}{6}$$

follows a Chi-squared distribution with $$\frac{1}{6} p(p+1)(p+2)$$

degrees of freedom, and the kurtosis test statistic:

$$\frac{k - p(p+2)}{\sqrt{8p(p+2)n^{-1}}}$$

follows a standard normal. Target tracking process 50 may conduct a hypothesis test for multivariate normality using the distribution of the skew or kurtosis test statistics. Using the above-described formulas for multiple samples of one-thousand points each from a 6-dimensional multivariate normal population, 95% of the time the values for skew are contained within the interval s∈[0,0.4468] and 95% of the time the values for kurtosis are contained within the interval k∈[46.785,49.215].

The use of an unscented transform may preserve the multivariate normality, as determined by propagating a multivariate normal sample through the transform and assessing the normality of the result using the methods described above. Target tracking process 50 may deem the input sample "ideal" if it has a p-value of essentially 100% for whatever parameter is used to assess multivariate normality. The value of the parameter for the output sample (or its p-value) may then serve as a measure of the degree to which the transformation preserves multivariate normality. This technique was used to quantify the conditions under which an unscented transform of the type described by Julier and Uhlmann in their 1997 paper entitled "A New Extension of the Kalman Filter to Nonlinear Systems" may reliably be used to compute the uncertainties in a state vector estimate.

Generating 114 a probability distribution for the endpoint velocities of flight trajectory orbital ellipse 60 by using the above-described method, target tracking process 50 may compare the first and second state vectors to the flight trajectory orbital ellipse 60. If the velocity measurements from the first and second kinematic state measurements fit within the probability distribution, target tracking process 50 may correlate the second kinematic state measurement as a ballistic continuation of the first kinematic state measurement.

If the first and second kinematic state measurements define flight trajectory orbital ellipse 60, target tracking process 50 may define 112 the first and second projectile detection events as portions of a flight trajectory of a single ballistic projectile. Target tracking process 50 may propagate 116 flight trajectory orbital ellipse 60 forward and backward to determine the origin of the projectile, as well as the intended target. The forward propagation of the flight trajectory (defined by flight trajectory orbital ellipse 60) may also allow for coordinating the interception of the projectile (e.g., target 66) before it reaches its intended target. Interception of the projectile (e.g., target 66) may be important in situations in which the projectile is capable of target destruction or damage.

The methods described herein for determining a track correlation between two projectile detection events may be used to track identification of additional projectile detection events. Accordingly, target tracking process 50 may obtain 118 a plurality of additional projectile detection events and may then compare 120 the kinematic state measurements from those additional projectile detection events to flight trajectory orbital ellipse 60 using the above-described methods. By utilizing such additional projectile detection events, the accuracy of the target tracking process 50 may be enhanced.

While the system is described above as utilizing two sensors (i.e., sensors 56, 58), this is for illustrative purposes only and is not intended to be a limitation of this disclosure. Specifically, the above-described system may utilize a single sensor to take the first and second kinematic state measurements.

While the system is described above as tracking targets, this is for illustrative purposes only and is not intended to be a limitation of this disclosure. For example, the above-described system may be utilized to track satellites, aircraft, weather systems, manufacturing processes, chemical processes, numerical performance evaluations, and any measured system where a state evolution model can be quantitatively articulated. In all cases, the novel technique is to approach a system not as being in an initial state that needs to be propagated forward in time or space (known mathematically as an initial value differential equation), but rather as having a set of endpoints for which a state propagation can be computed (known mathematically as a boundary value differential equation). Indeed, for any measured (and thus uncertain) "position-like" states, where a state evolution model can be quantitatively articulated, the approach is to solve the resulting boundary value problem to obtain "velocity-like" derivatives, which can be mathematically resolved to a much higher precision than that which can be directly measured, even for non-linear systems across large expanses of system evolution. Indeed, such precision actually increases with greater elapsed system evolution, in direct contrast to the current state of the art.

A number of implementations have been described. Nevertheless, it will be understood that various modifications may be made. Accordingly, other implementations are within the scope of the following claims.

What is claimed is:

1. A method of identifying the kinematic state of a single ballistic projectile comprising:
   obtaining a first kinematic state measurement of a first projectile detection event from a first sensor, wherein the first kinematic state measurement includes a first time measurement and a first state vector;
   obtaining a second kinematic state measurement of a second projectile detection event from a second sensor, wherein the second kinematic state measurement includes a second time measurement and a second state vector;
   determining if at least a portion of the first kinematic state measurement and at least a portion of the second kinematic state measurement define at least a portion of a flight trajectory orbital ellipse based upon, at least in part, a trajectory resulting from a solution of Lambert's Two-Point Orbital Boundary Value Problem; and
   if at least a portion of a flight trajectory orbital ellipse is defined, defining the first projectile detection event and the second projectile detection event as portions of a flight trajectory of a single ballistic projectile.

2. The method of claim 1 further comprising:
   propagating the at least a portion of a flight trajectory orbital ellipse to define a full flight trajectory for the single ballistic projectile.

3. The method of claim 1 wherein determining if at least a portion of the first kinematic state measurement and at least a portion of the second kinematic state measurement define at least a portion of a flight trajectory orbital ellipse includes:
   calculating a time differential between the first time measurement and the second time measurement;
   identifying a flight trajectory orbital ellipse defining a trajectory between a first position and velocity measurement associated with the first state vector and a second position and velocity measurement associated with the second state vector based upon the time differential; and
   statistically comparing the first and second state vectors against the flight trajectory orbital ellipse to determine if the first and second kinematic state measurements arise from a ballistic continuation of the single ballistic projectile.

4. The method of claim 3 wherein statistically comparing the first and second state vectors against the flight trajectory orbital ellipse to determine if the first and second kinematic state measurements arise from a ballistic continuation of the single ballistic projectile includes:
   generating at least one probability distribution for at least one trajectory variable to enable a statistical comparison between a detected state vector and the flight trajectory orbital ellipse.

5. The method of claim 3 further comprising:
   obtaining a plurality of additional kinematic state measurements of a plurality of additional projectile detection events from a plurality of additional sensors, wherein the plurality of additional kinematic state measurements each include a time measurement and a state vector; and
   comparing the plurality of additional kinematic state measurements against the flight trajectory orbital ellipse to determine if the plurality of additional kinematic state measurements arise from the ballistic continuation of the single ballistic projectile.

6. The method of claim 1 wherein the single ballistic projectile is a target.

7. The method of claim 1 wherein the first and second sensors are a single sensor.

8. A computer program product residing on a computer readable medium having a plurality of instructions stored thereon which, when executed by a processor, cause the processor to perform operations comprising:
obtaining a first kinematic state measurement of a first projectile detection event from a first sensor, wherein the first kinematic state measurement includes a first time measurement and a first state vector;
obtaining a second kinematic state measurement of a second projectile detection event from a second sensor, wherein the second kinematic state measurement includes a second time measurement and a second state vector;
determining if at least a portion of the first kinematic state measurement and at least a portion of the second kinematic state measurement define at least a portion of a flight trajectory orbital ellipse based upon, at least in part, a trajectory resulting from a solution of Lambert's Two-Point Orbital Boundary Value Problem; and
if at least a portion of a flight trajectory orbital ellipse is defined, defining the first projectile detection event and the second projectile detection event as portions of a flight trajectory of a single ballistic projectile.

9. The computer program product of claim 8 further comprising instructions for:
propagating the at least a portion of a flight trajectory orbital ellipse to define a full flight trajectory for the single ballistic projectile.

10. The computer program product of claim 8 wherein the instructions for determining if at least a portion of the first kinematic state measurement and at least a portion of the second kinematic state measurement define at least a portion of a flight trajectory orbital ellipse include instructions for:
calculating a time differential between the first time measurement and the second time measurement;
identifying a flight trajectory orbital ellipse defining a trajectory between a first position and velocity measurement associated with the first state vector and a second position and velocity measurement associated with the second state vector based upon the time differential; and
statistically comparing the first and second state vectors against the flight trajectory orbital ellipse to determine if the first and second kinematic state measurements arise from a ballistic continuation of the single ballistic projectile.

11. The computer program product of claim 10 wherein the instructions for statistically comparing the first and second state vectors against the flight trajectory orbital ellipse to determine if the first and second kinematic state measurements arise from a ballistic continuation of the single ballistic projectile include instructions for:
generating at least one probability distribution for at least one trajectory variable to enable a statistical comparison between a detected state vector and the flight trajectory orbital ellipse.

12. The computer program product of claim 10 further comprising instructions for:
obtaining a plurality of additional kinematic state measurements of a plurality of additional projectile detection events from a plurality of additional sensors, wherein the plurality of additional kinematic state measurements each include a time measurement and a state vector; and
comparing the plurality of additional kinematic state measurements against the flight trajectory orbital ellipse to determine if the plurality of additional kinematic state measurements arise from the ballistic continuation of the single ballistic projectile.

13. The computer program product of claim 8 wherein the single ballistic projectile is a target.

14. The computer program product of claim 8 wherein the first and second sensors are a single sensor.

15. A target tracking system comprising:
at least two temporally-separated sensors, wherein:
the first temporally-separated sensor is configured to obtain a first kinematic state measurement of a first projectile detection event, wherein the first kinematic state measurement includes a first time measurement and a first state vector, and
the second temporally-separated sensor is configured to obtain a second kinematic state measurement of a second projectile detection event, wherein the second kinematic state measurement includes a second time measurement and a second state vector;
a computing device operably coupled to the at least two temporally-separated sensors, the computing device configured to perform operations comprising:
determining if at least a portion of the first kinematic state measurement and at least a portion of the second kinematic state measurement define at least a portion of a flight trajectory orbital ellipse based upon, at least in part, a trajectory resulting from a solution of Lambert's Two-Point Orbital Boundary Value Problem; and
if at least a portion of a flight trajectory orbital ellipse is defined, defining the first projectile detection event and the second projectile detection event as portions of a flight trajectory of a single ballistic projectile.

16. The target tracking system of claim 14 wherein the computing device is further configured to perform operations comprising:
propagating the at least a portion of a flight trajectory orbital ellipse to define a full flight trajectory for the single ballistic projectile.

17. The target tracking system of claim 15 wherein determining if at least a portion of the first kinematic state measurement and at least a portion of the second kinematic state measurement define at least a portion of a flight trajectory orbital ellipse includes:
calculating a time differential between the first time measurement and the second time measurement;
identifying a flight trajectory orbital ellipse defining a trajectory between a first position and velocity measurement associated with the first state vector and a second position and velocity measurement associated with the second state vector based upon the time differential; and
statistically comparing the first and second state vectors against the flight trajectory orbital ellipse to determine if the first and second kinematic state measurements arise from a ballistic continuation of the single ballistic projectile.

18. The target tracking system of claim 17 wherein statistically comparing the first and second state vectors against the flight trajectory orbital ellipse to determine if the first and second kinematic state measurements arise from a ballistic continuation of the single ballistic projectile includes:

generating at least one probability distribution for at least one trajectory variable to enable a statistical comparison between a detected state vector and the flight trajectory orbital ellipse.

19. The target tracking system of claim 17 wherein the computing device is further configured to perform operations comprising:

obtaining a plurality of additional kinematic state measurements of a plurality of additional projectile detection events from a plurality of additional sensors, wherein the plurality of additional kinematic state measurements each include a time measurement and a state vector; and comparing the plurality of additional kinematic state measurements against the flight trajectory orbital ellipse to determine if the plurality of additional kinematic state measurements arise from the ballistic continuation of the single ballistic projectile.

20. The target tracking system of claim 15 wherein the single ballistic projectile is a target.

* * * * *